(12) United States Patent
Choo et al.

(10) Patent No.: US 8,537,069 B2
(45) Date of Patent: Sep. 17, 2013

(54) RADIO FREQUENCY IDENTIFICATION TAG

(75) Inventors: Jae Yul Choo, Seongnam-si (KR); Jeong Ki Ryoo, Anyang-si (KR); Jin Kuk Hong, Hwaseong-si (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 389 days.

(21) Appl. No.: 12/985,284

(22) Filed: Jan. 5, 2011

(65) Prior Publication Data
US 2011/0168787 A1 Jul. 14, 2011

(30) Foreign Application Priority Data
Jan. 8, 2010 (KR) .................. 10-2010-0001678

(51) Int. Cl.
*H01Q 9/28* (2006.01)

(52) U.S. Cl.
USPC ........................................... 343/795

(58) Field of Classification Search
USPC ............... 340/572.7; 343/795, 700 MS
See application file for complete search history.

(56) References Cited

U.S. PATENT DOCUMENTS

| | | | |
|---|---|---|---|
| 7,633,445 B2 * | 12/2009 | Yamagajo et al. | 343/700 MS |
| 8,022,878 B2 * | 9/2011 | Yamagajo et al. | 343/700 MS |
| 8,068,057 B2 * | 11/2011 | Yamagajo et al. | 343/700 MS |
| 2007/0176839 A1 * | 8/2007 | Kai et al. | 343/803 |
| 2008/0180328 A1 * | 7/2008 | Yamagajo et al. | 343/700 MS |
| 2010/0117833 A1 * | 5/2010 | Kai et al. | 340/572.1 |

FOREIGN PATENT DOCUMENTS

| | | |
|---|---|---|
| CN | 101236612 | 8/2008 |
| CN | 101593866 | 12/2009 |
| EP | 2056239 | 5/2009 |

OTHER PUBLICATIONS

The State Intellectual Property Office of the People's Republic of China Application Serial No. 201110006266.3, Office Action dated Dec. 5, 2012, 6 pages.

* cited by examiner

*Primary Examiner* — Huedung Mancuso
(74) *Attorney, Agent, or Firm* — Lee, Hong, Degerman, Kang & Waimey (57) ABSTRACT

An RFID tag is disclosed, wherein the RFID tag includes a radiation pattern printing on an upper surface of a first dielectric substrate, a cross (+) type slot formed towards an upper part, a lower part, a left-side and a right-side on the basis of a center of the radiation pattern to divide a left-side radiation pattern and a right-side radiation pattern, a plurality of first connection patterns formed inside the upper part of the cross (+) type slot, connecting the left-side radiation pattern with the right-side radiation pattern, a tag chip settled inside the lower part of the cross (+) type slot, a feeding loop pattern electrically connecting the tag chip and the left-side radiation pattern, and the right-side radiation pattern, and a plurality of second connection patterns connecting the left-side radiation pattern and the right-side radiation pattern at an end part of the feeding loop pattern.

8 Claims, 12 Drawing Sheets

FIG. 13 ant pattern, a tag chip settled inside the lower part of the cross (+) type slot, a feeding loop pattern electrically connecting the tag chip and the left-side radiation pattern, and the right-side radiation pattern, and a plurality of second connection patterns connecting the left-side radiation pattern and the right-side radiation pattern at an end part of the feeding loop pattern.

RADIO FREQUENCY IDENTIFICATION TAG

CROSS-REFERENCE TO RELATED APPLICATIONS

Pursuant to 35 U.S.C. §119 (a), this application claims the benefit of earlier filing date and right of priority to Korean Patent Application No. 10-2010-0001678, filed on Jan. 8, 2010, the contents of which are hereby incorporated by reference in their entirety

BACKGROUND OF THE INVENTION

1. Field of the Invention

The present invention relates to an RFID (Radio Frequency Identification) tag suitable to an environment recognizing individual items, capable of being attached to items of various dielectrics including a metal item.

2. Description of the Related Art

An RFID system of a UHF (Ultra-High Frequency) band is a so called highlighted information recognition technology over an RFID system of a HF (High Frequency) band, due to an information transmission ability of high efficiency.

An RFID system of the UHF band is comprised of an RFID tag storing item-related information and a reader for recognizing the RFID tag. Each of the tag and reader uses an antenna, and transceive given information via a medium of electric wave. In particular, a passive-type tag is comprised of an antenna and a tag chip, free from a battery, and capable of being used with inexpensive price.

A passive-type tag of an UHF band principally determines an item recognition characteristic of an entire RFID system, and is in particular, dependent on a complex conjugate matching of a tag antenna with a tag chip, a radiation pattern of a tag, and a tag chip performance, for capability of the tag.

The tag developed based on such ability may include a tag having an operating frequency of 860~960 MHz for availability in a world-wide level, a tag holding a good quality of recognition characteristic for various dielectric constant's items, and a special-type tag designed possibly to use in metal items.

However, the tags have been generally developed for the purpose of wide-usability in a use environment, and tags having an improved recognition area by adjusting a radiation characteristic of tags itself need further development.

SUMMARY OF THE INVENTION

Accordingly, challenges to be solved by the present invention realizes a complex conjugate matching with a tag chip using a T-matching structure, and provides an RFID tag having simultaneously a wide-area radiation beam width and high diversity by adjusting a line width of a tag antenna.

In addition, the present invention provides an RFID tag able to derive a wide recognition area and a long-distance recognition characteristic in a tag recognition environment using readers due to a wide radiation beam width and high diversity.

In one general aspect of the present disclosure, an RFID tag comprises: a first dielectric substrate, a radiation pattern printing on an upper surface of the first dielectric substrate, a cross (+) type slot formed towards an upper part, a lower part, a left-side and a right-side on the basis of a center of the radiation pattern to divide a left-side radiation pattern and a right-side radiation pattern, a plurality of first connection patterns formed inside the upper part of the cross (+) type slot, connecting the left-side radiation pattern with the right-side In some exemplary embodiments, gap materials are stacked at a lower part of the first dielectric substrate.

In some exemplary embodiments, the gap materials include a second dielectric substrate and a parasitic metal layer formed in a predetermined interval at upper surface left/right both sides of the second dielectric substrate.

In some exemplary embodiments, the feeding loop pattern includes a first feeding loop pattern horizontally formed at left/right both sides of the tag chip, a second feeding loop pattern upwardly curved at an end part of the first feeding loop pattern, and a third feeding loop pattern horizontally curved at an upper-side end part of the second feeding loop pattern, and electrically connected to the radiation pattern placed in both end parts of the left/right sides of the cross (+) type slot.

In some exemplary embodiments, the plurality of second connection patterns connects the third feeding loop pattern to the radiation pattern.

In another general aspect of the present disclosure, an RFID tag comprises: a first dielectric substrate, a radiation pattern printing on an upper surface of the first dielectric substrate, a T type slot formed towards a lower part, a left-side and a right-side in the radiation pattern on the basis of a center of the radiation pattern, a tag chip settled inside the lower part of the T type slot, a feeding loop pattern electrically connecting the tag chip with the radiation pattern, and a plurality of second connection patterns connecting the radiation pattern at an end part of the feeding loop pattern.

In some exemplary embodiments, gap materials are stacked at a lower part of the first dielectric substrate.

In some exemplary embodiments, the gap materials include a second dielectric substrate and a parasitic metal layer formed in a predetermined interval at upper surface left/right both sides of the second dielectric substrate.

In some exemplary embodiments, the feeding loop pattern includes a first feeding loop pattern horizontally formed at left/right both sides of the tag chip, a second feeding loop pattern upwardly curved at an end part of the first feeding loop pattern, and a third feeding loop pattern horizontally curved at an upper-side end part of the second feeding loop pattern, and electrically connected to the radiation pattern placed in both end parts of the left/right sides of the T type slot.

In some exemplary embodiments, the plurality of second connection patterns connects the third feeding loop pattern to the radiation pattern.

In addition, the present invention provides an RFID tag having high adaptability in terms of a changing effective wavelength in an actual state of items attachment by diversifying a flowing of currents induced to an antenna by a wide antenna line.

Technical challenges to be achieved by the present invention is not limited to the above-mentioned issues, and other technical challenges unstated would be clearly understood by those having ordinary knowledge in the art of the present invention reading from the following recitation.

BRIEF DESCRIPTION OF THE DRAWINGS

Hereafter, the present invention will be described in more detail through embodiments unrestricting the invention, with reference to the annexed drawings, wherein same substances in some drawings are designated identical numerals.

DETAILED DESCRIPTION OF THE INVENTION

The following detailed description is by way of example, and no more than shows an embodiment of the invention. Also, the principle and concept of the present invention is provided for the purpose of being most useful and easy describing.

Thus, a redundant detailed structure in a way to a basic understanding of the invention is not provided intentionally and several kinds of forms put into practice from the substance of the invention, with those skilled in the art, are exemplified through drawings.

Figure 1:
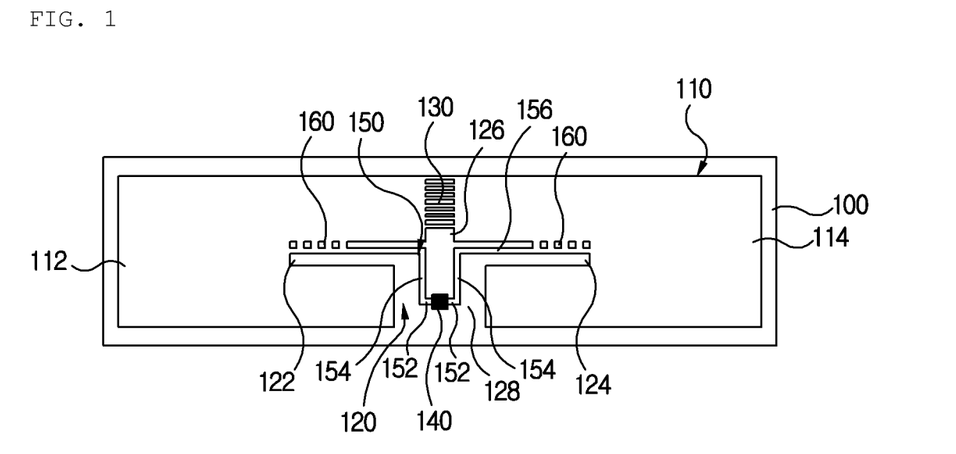
FIG. 1 is a planar view showing a construction of one preferred embodiment of a tag of the present invention.

FIG. 1 is a planar view showing a construction of one preferred embodiment of a tag of the present invention. Herein, a symbol 100 is a first dielectric substrate. For example, the first dielectric substrate 100 uses PET (Poly Ethylene Terephthalate) comprised of flexible material in consideration of a tag's attachment environment.

A symbol 110 is a radiation pattern formed at the upper surface of the first dielectric substrate 100. The radiation pattern 110 may be formed, for example, through a procedure that metal substance such as Cu or aluminum is printed on the upper part of the first dielectric substrate 100.

A cross (+) type slot 120 is formed at the radiation pattern 110 to divide into a left-side radiation pattern 112 and a right-side radiation pattern 114.

And, a breadth of both left/right slots 122, 124 in the cross (+) type slot 120 is identically formed, and a width of a lower slot 128 is widely formed compared to that of an upper part slot 126.

A plurality of first connection patterns 130 is formed inside the upper slot 126 to connect through between the left-side radiation pattern 112 and the right-side radiation pattern 114.

A tag chip 140 is attached to a middle part of the lower slot 128, so that by electrically connecting the tag chip 140 and the radiation pattern 110 at both end parts of left/right bilateral sides slots 122, 124, a feeding loop pattern 150 is printed.

The feeding loop pattern 150 is comprised of a first feeding loop pattern 152 horizontally formed at left/right both sides of the tag chip 140, a second feeding loop pattern 154 upwardly curved at an end part of the first feeding loop pattern 152, a third feeding loop pattern 156 horizontally curved at an upper-side end part of the second feeding loop pattern 154 to electrically connect the radiation pattern 110 of both ends of left/right side slots 122, 124.

And, a plurality of second connection patterns 160 is formed between the third feeding loop pattern 156, and the left-side radiation pattern 112 and the right-side radiation pattern 114 placed at the upper part of the third feeding loop pattern 156.

A tag of the present invention having such a construction is used in attaching to non-metal material such as paper and woods, in which electromagnetic waves transmitted by a reader (not shown in the figure) are received by the left-side radiation pattern 112 and the right-side radiation pattern 114, and the received electromagnetic waves are delivered to the tag chip 140 through the feeding loop pattern 150.

Then, the tag chip 140 normally operates, and outputs predetermined information internally stored. The predetermined information outputted by the tag chip 140 is induced into the left-side radiation pattern 112 and the right-side radiation pattern 114 through the feeding loop pattern 150, and radiated to the air.

The feeding loop pattern 150, a major part determining matching characteristics of a tag of the present invention, is complex conjugate matched with the tag chip 140.

Figure 2A:
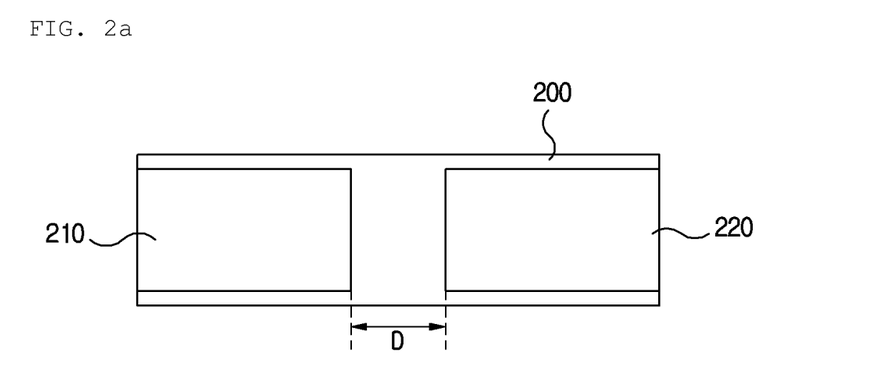
FIGS. 2a and 2b are a planar view and a cross-sectional view showing a preferred embodiment of gap materials used in case a tag of the present invention is attached to a metal object.
Figure 2B:
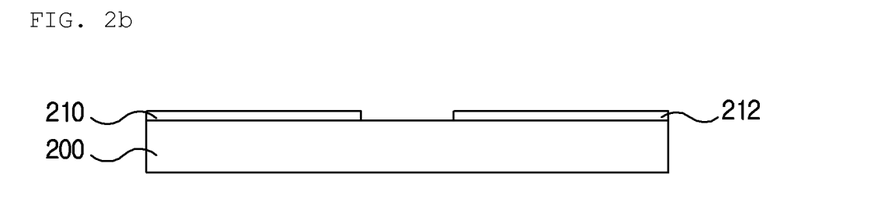

FIGS. 2a and 2b are a planar view and a cross-sectional view showing a preferred embodiment of gap materials used in case a tag of the present invention is attached to a metal object. Herein, a symbol 200 is a second dielectric substrate. The second dielectric substrate 200 ensures a given gap distance between a tag and metal material in a case a tag of the present invention is attached to the metal material.

Symbols 210 and 212 are parasitic metal layers. The parasitic metal layers 210, 212 are formed in a given interval D in between them at upper surface left/right both sides, and when the tag is attached to an upper part of the gap materials, the parasitic metal layers 210, 212 resonate.

Figure 3:
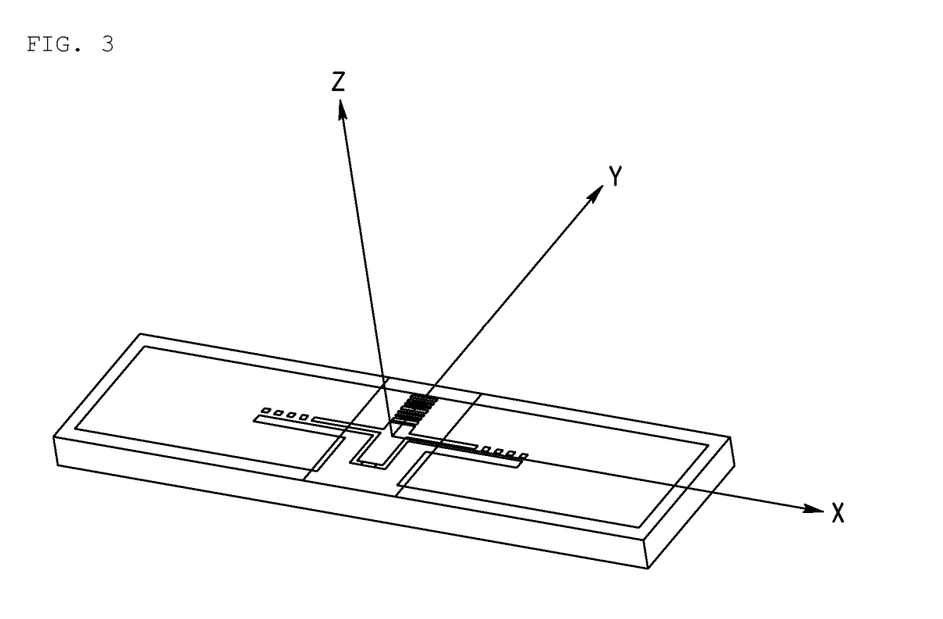
FIG. 3 is a diagram showing a case gap materials are used, attached to a lower part of a tag of the present invention.

The gap materials according to the present invention having such a construction, when a tag of the present invention is attached to metal materials, are attached to a lower part of the tag for use as shown in FIG. 3.

The parasitic metal layers 210, 212 of the gap materials act to adjust a resonant frequency on the surface of metal materials attached with the tag by adjusting a size of the feeding loop pattern 150. And a current induced by the feeding loop pattern 150 makes the parasitic metal layers 210, 212 operate as an aperture antenna.

Figure 4:
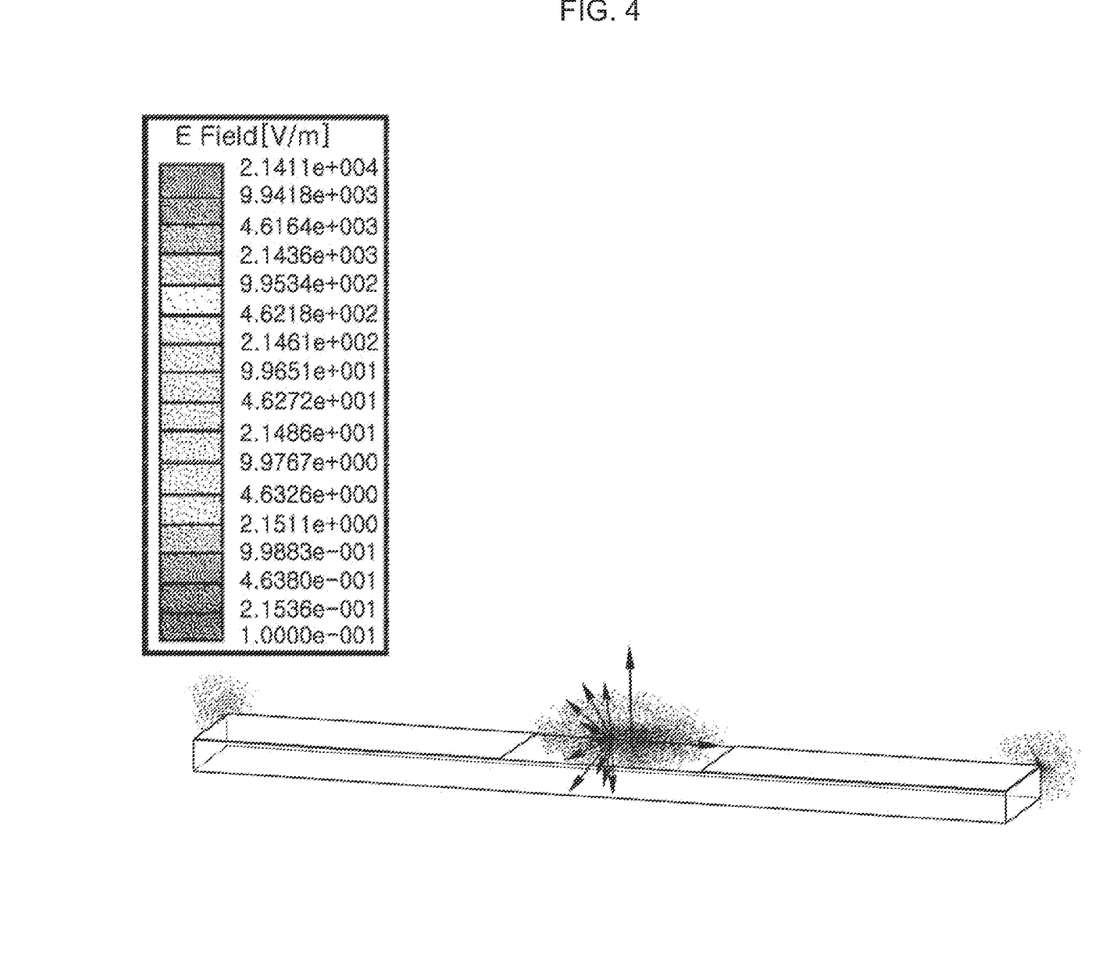
FIG. 4 is a diagram showing that gap materials attached at a lower part of a tag of the present invention operate as an aperture antenna.

FIG. 4 shows that gap materials operate as an aperture antenna by a current induced by the feeding loop pattern 150.

Figure 5:
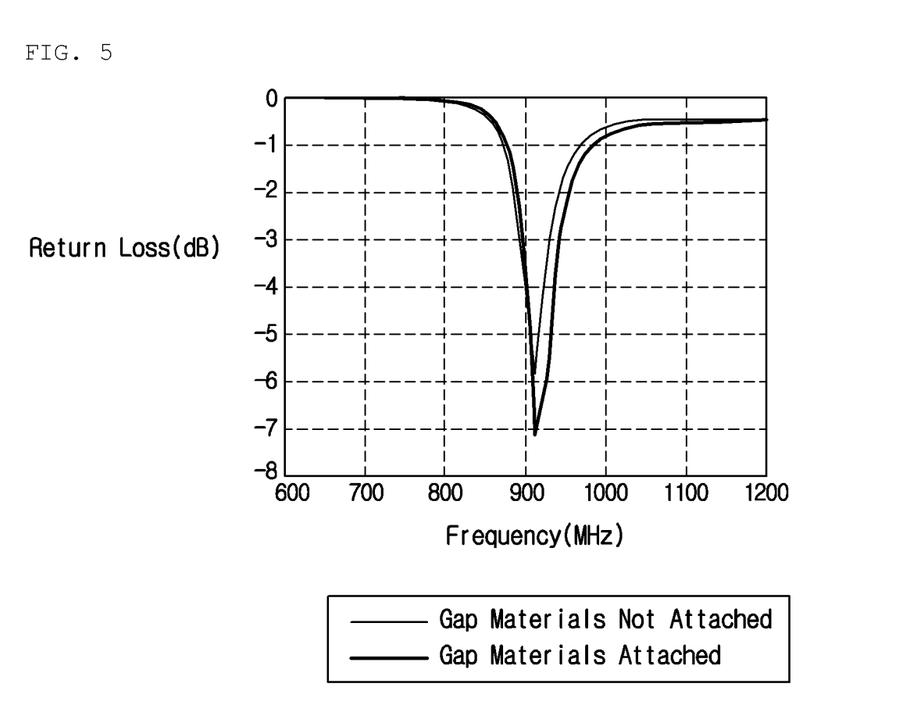
FIG. 5 is a diagram showing of a matching characteristic in cases that a tag of the present invention is not attached to gap materials and a tag of the present invention is attached to gap materials.
Figure 6:
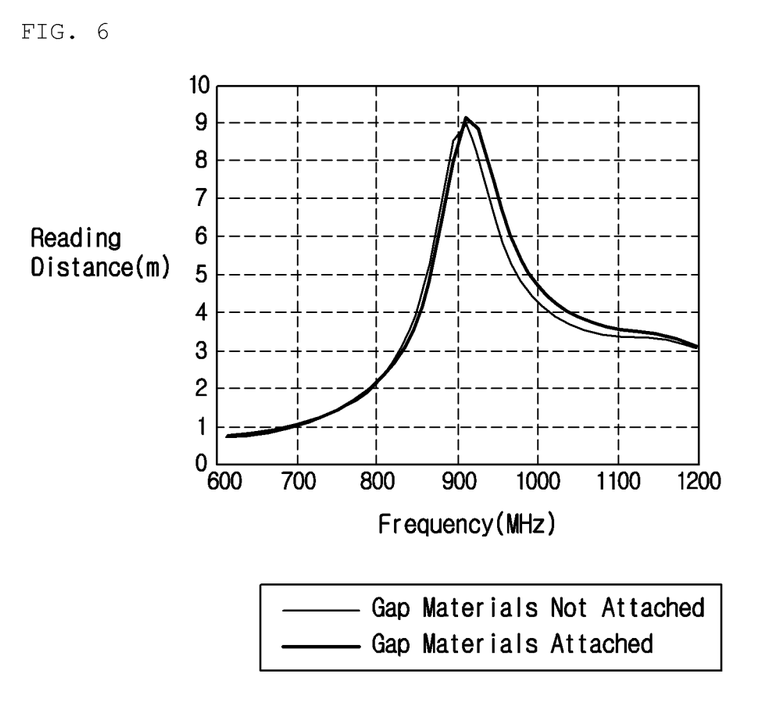
FIG. 6 is a diagram showing of characteristics of a front-side recognition distance in cases that a tag of the present invention is not attached to gap materials and a tag of the present invention is attached to gap materials.

FIG. 5 is a diagram showing of a matching characteristic in cases that a tag of the present invention is not attached to gap materials and a tag of the present invention is attached to gap materials, and FIG. 6 is a diagram showing of characteristics of a front-side recognition distance in cases that a tag of the present invention is not attached to gap materials and a tag of the present invention is attached to gap materials.

Referring to FIG. 5 and FIG. 6, an impedance of a tag chip 140 according to the invention has an impedance of 10-j165Ω at 912 MHz, and characteristics of an antenna are derived from a numerical analysis of electromagnetics.

In terms of characteristics of a front-side recognition distance, a reader applies 36 dBm EIRP (Effective Isotropically Radiated Power) electromagnetic waves prescribed output, and as a minimum needed power for the operation of a tag chip 140, -18 dBm is applied.

As shown in FIG. 5 and FIG. 6, a tag not attached to gap materials and a tag attached to gap materials have a complex conjugate matching characteristic of good quality at 912 MHz, frequencies used in a tag of the domestic, and a recognition distance in the front-side of a tag also has a resultant value of 9 m at 912 MHz.

As known from a derived result, it can be understood that a tag not attached to gap materials and a tag attached to gap materials are optimized pursuant to frequencies used in the domestic.

Figure 7A:
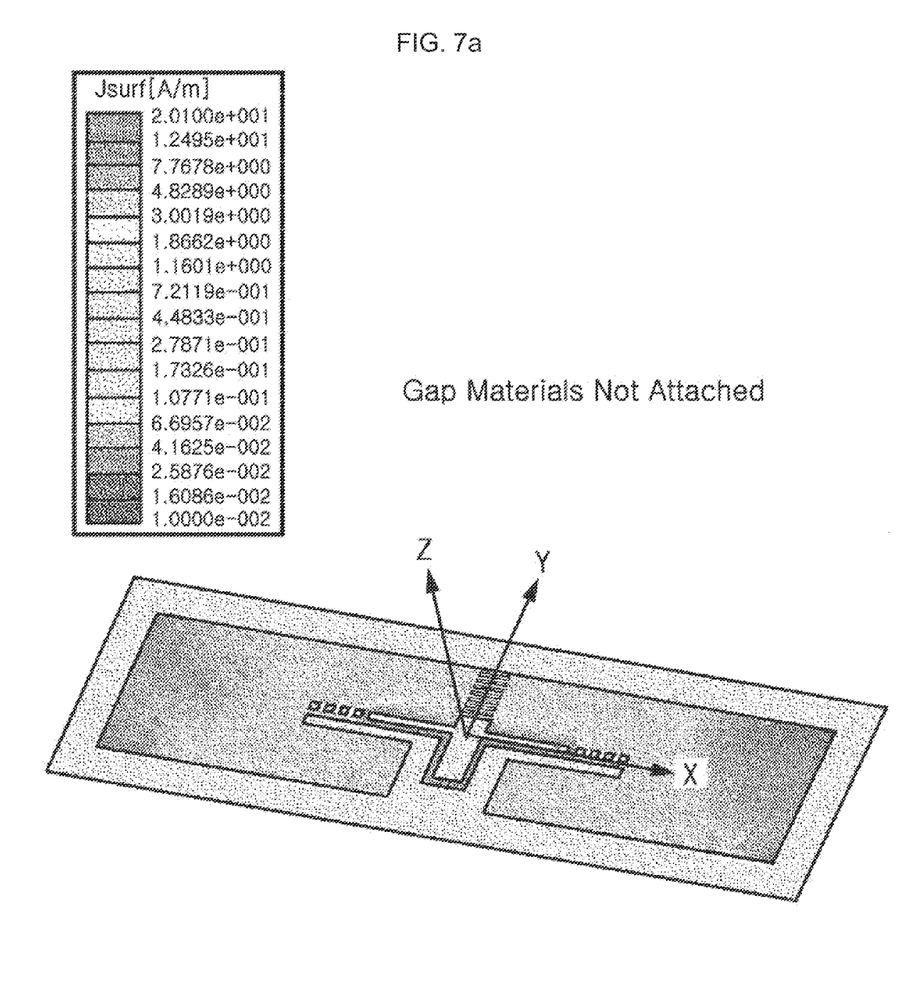
FIGS. 7a and 7b are diagrams showing a distribution of an induced current of 912 MHz in case a tag of the present invention is not attached to gap materials and in case a tag of the present invention is attached to gap materials.
Figure 7B:
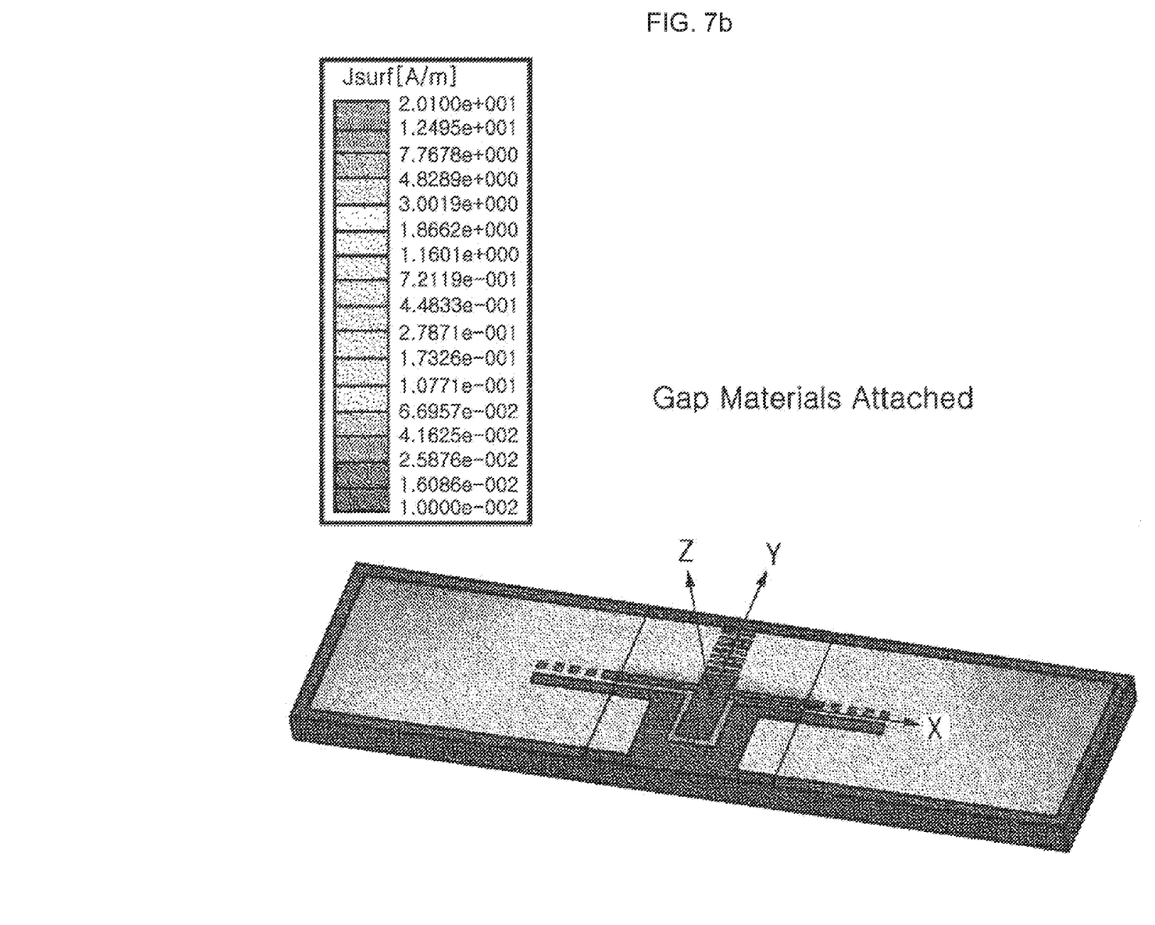

FIGS. 7a and 7b are diagrams showing a distribution of an induced current of 912 MHz in case a tag of the present invention is not attached to gap materials and in case a tag of the present invention is attached to gap materials.

Referring to FIGS. 7a and 7b, according to the present invention, it can be shown that the induced current strongly flows through the feeding loop pattern 150, thus gradually inducing a current to a dipole radiator.

From such a current characteristic, it can be derived that a tag of the present invention has good quality of adaptability in circumstances of various recognition objects. That is, over various recognition objects, a tag of the present invention effectively uses a wide, thick line to create various current flow paths, thus to efficiently address an effective wavelength change by a recognition object.

Figure 8A:
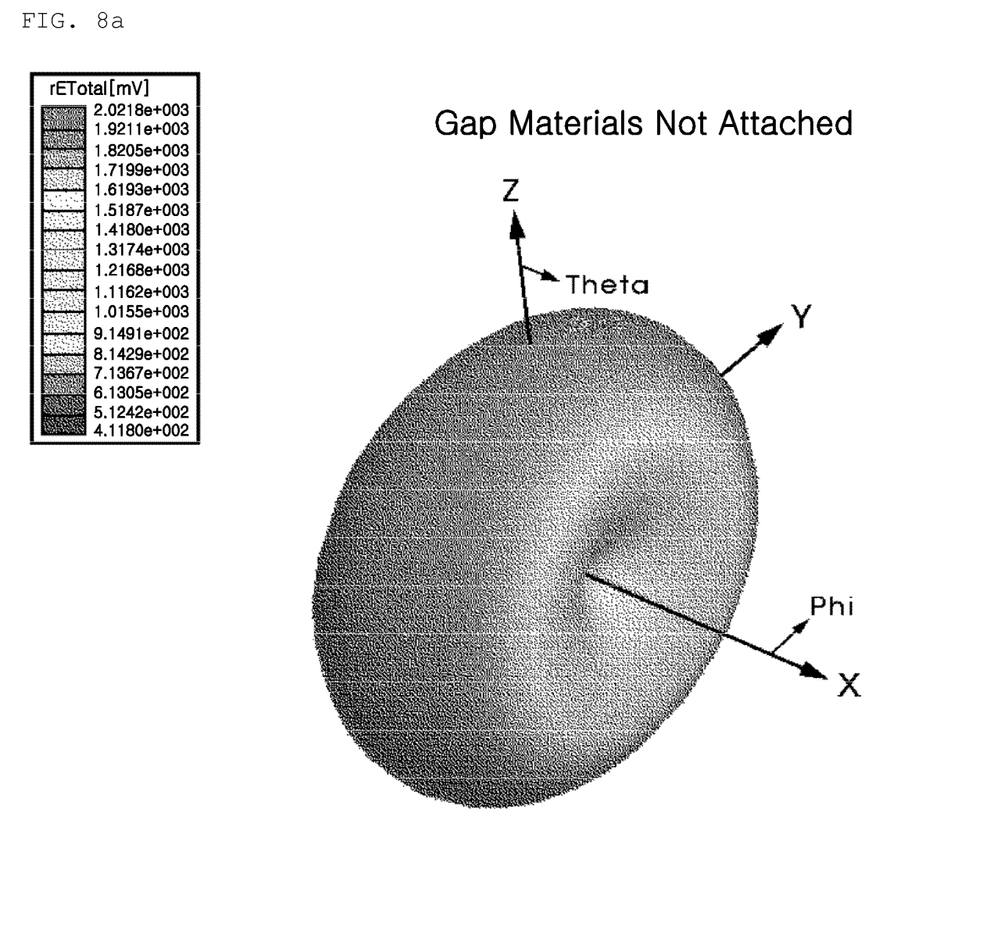
FIGS. 8a and 8b are diagrams showing a radiation pattern of 912 MHz in case a tag of the present invention is not attached to gap materials and in case a tag of the present invention is attached to gap materials.
Figure 8B:
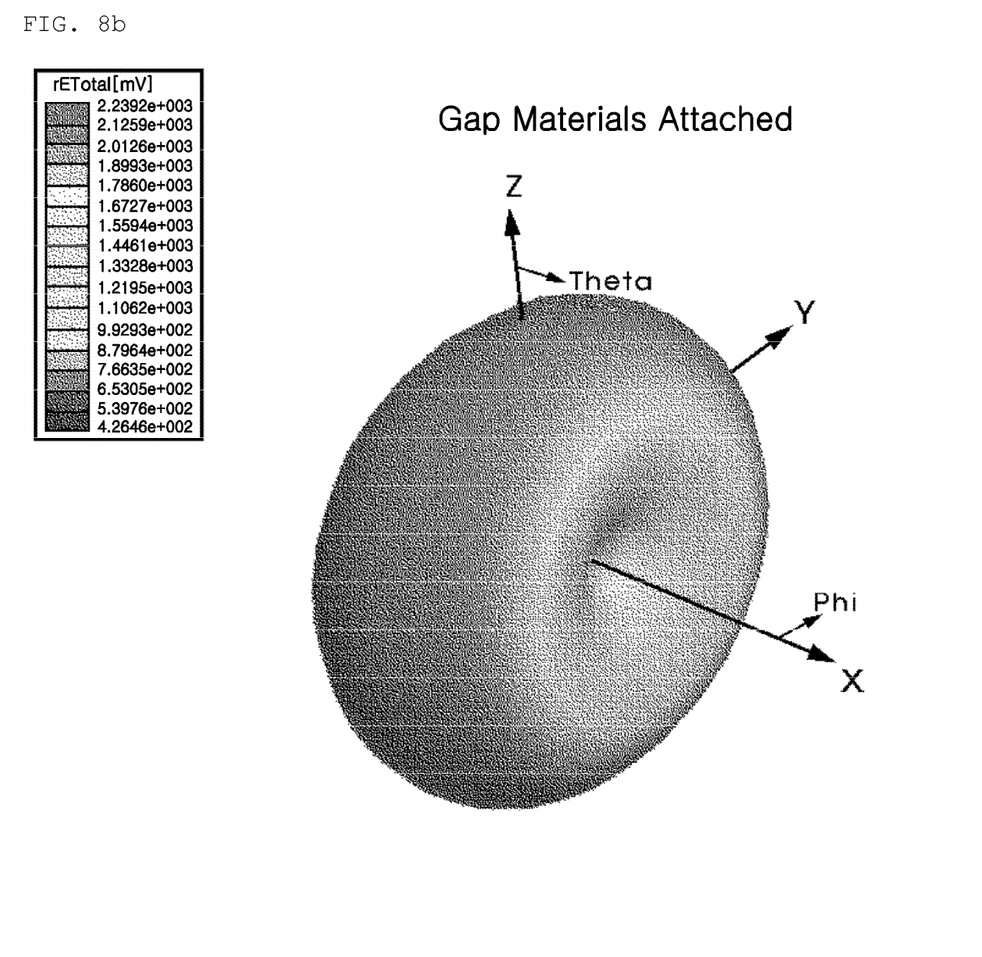

FIGS. 8a and 8b are diagrams showing a radiation pattern of 912 MHz in case a tag of the present invention is not attached to gap materials and in case a tag of the present invention is attached to gap materials.

In a case of general dipole antenna, it has an isotropic property, thus making a radiation pattern of donuts shape, but a tag of the present invention, as illustrated in FIGS. 8a and 8b, has a radiation pattern of donuts form with much greater thickness in a desired direction by efficiently optimizing a thickness of a line.

Therefore, a tag of the present invention shows a characteristic of having a more intense radiation at -y axis direction than y axis direction. Such an optimized radiation pattern has a stable recognition characteristic by deriving an ampler recognition region in an object recognition situation.

Figure 9:
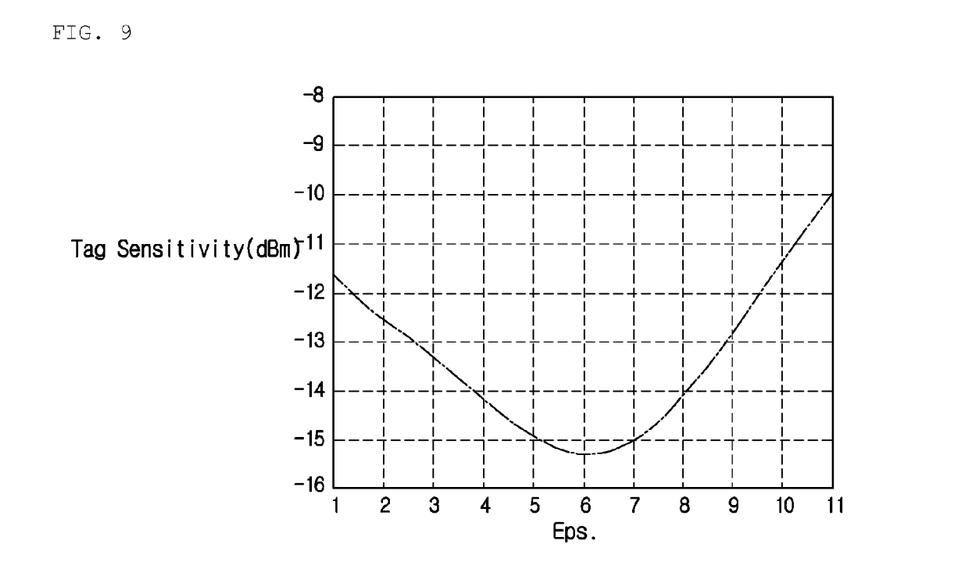
FIG. 9 is a diagram showing tag sensitivity of a tag of the present invention on various dielectrics having a thickness of 5 mm.

FIG. 9 is a diagram showing tag sensitivity of a tag of the present invention on various dielectrics having a thickness of 5 mm, indicating a capacity change degree of a tag of the present invention in a dielectric with various dielectric constants. That is, it means that a tag operate also at a very low power when a minimum operating power of the tag is smaller.

Referring to FIG. 9, a tag of the present invention having a low minimum operating power characteristic in a real recognition environment may well recognize at a far longer-distance over previous tags. Such a tag of the present invention has been optimized for objects with a dielectric constant of 1~11, and designed to achieve an utmost performance at a dielectric constant of 6.

Such a characteristic is a derived result by optimizing shapes of a feeding loop pattern 150 and a radiation pattern, and it can be confirmed operating with a property of less than -10 dBm over a relatively various dielectric.

Figure 10A:
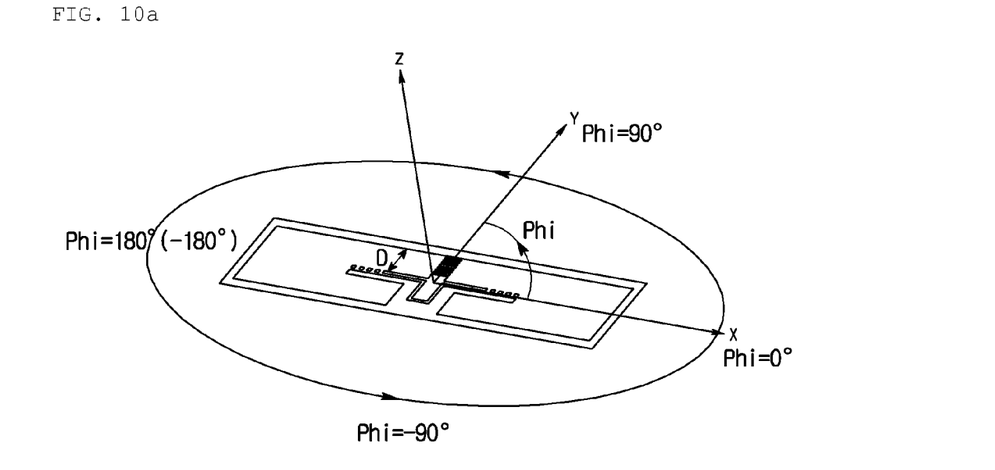
FIGS. 10a and 10b are diagrams showing simulation results for a width of a radiation pattern.
Figure 10B:
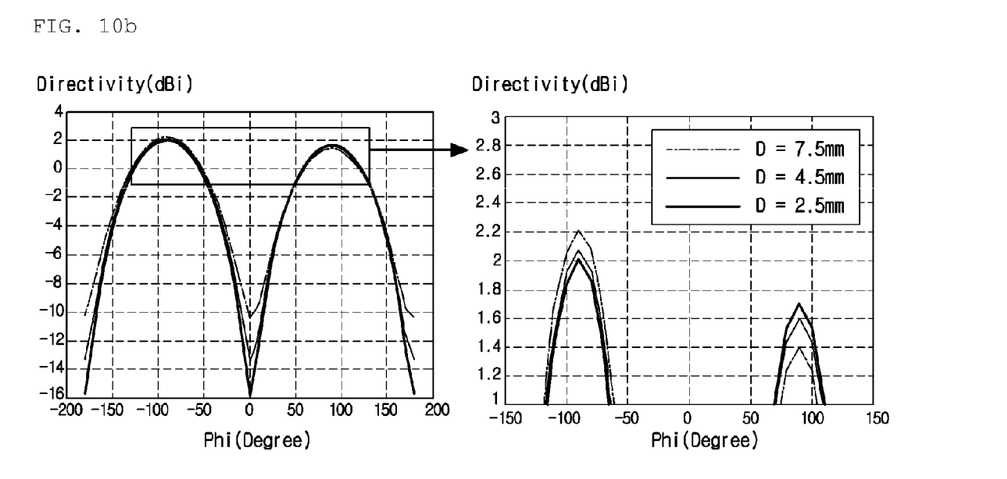

FIGS. 10a and 10b are diagrams showing simulation results for a width of a radiation pattern. The width D of the radiation pattern 110 impacts on a radiation beam width, diversity of a tag of the present invention. Referring to FIGS. 10a and 10b, as a result of orderly lessening a dimension of the width D of the radiation pattern 110 to 7.5 mm, 4.5 mm, and 2.5 mm, it could be confirmed that a radiation beam width of the tag is gradually decreased and diversity of the tag is also reduced.

Such a result means that a tag of the present invention maintains a width of a radiation pattern of 7.5 mm and derives an ample radiation beam width and diversity, thus efficiently having a wide recognition region.

Figure 11:
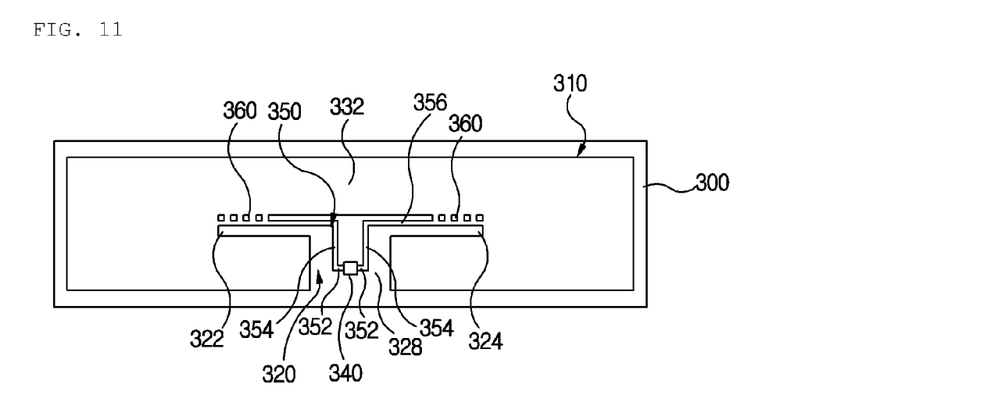
FIG. 11 is a planar view showing a construction of another preferred embodiment of a tag of the present invention.

FIG. 11 is a planar view showing a construction of another preferred embodiment of a tag of the present invention. A symbol 320 is a T type slot. The T type slot 320 is formed towards a lower part 328, a left-side 322, a right-side 324 on the basis of a center of the radiation pattern 310.

Referring to FIG. 11, in the construction of a tag of the present invention, other than forming a plurality of first connection patterns at an upper slot, by integrally connecting a left-side radiation pattern and a right-side radiation pattern with one connection pattern 332, a plurality of second connection patterns 360 among the third feeding loop pattern 356, and the left-side radiation pattern and the right-side radiation pattern may be configurably formed.

Figure 12:
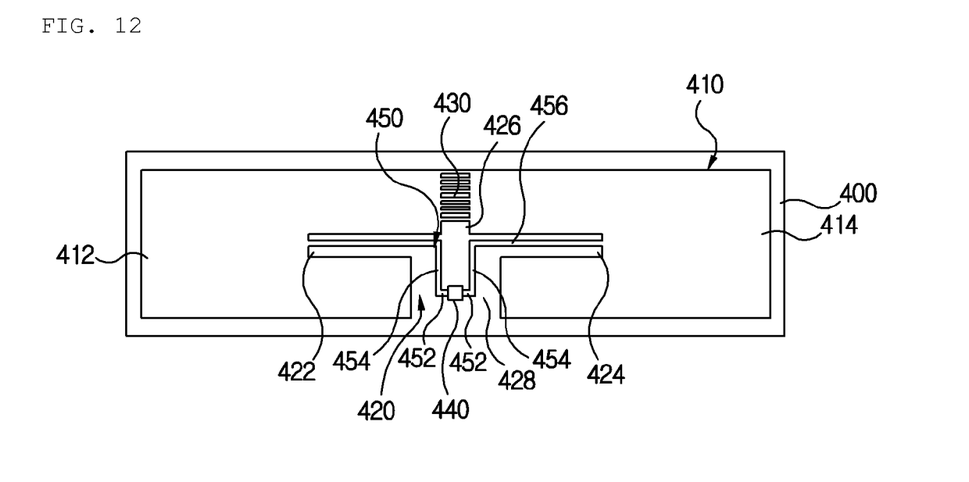
FIG. 12 is a planar view showing a construction of still another preferred embodiment of a tag of the present invention.

FIG. 12 is a diagram showing a construction of a preferred another embodiment of a tag of the present invention. Referring to FIG. 12, in constructing a tag of the present invention, other than forming a plurality of second connection patterns, on an upper slot 426 a plurality of first connection patterns 430 may be formed.

Figure 13:
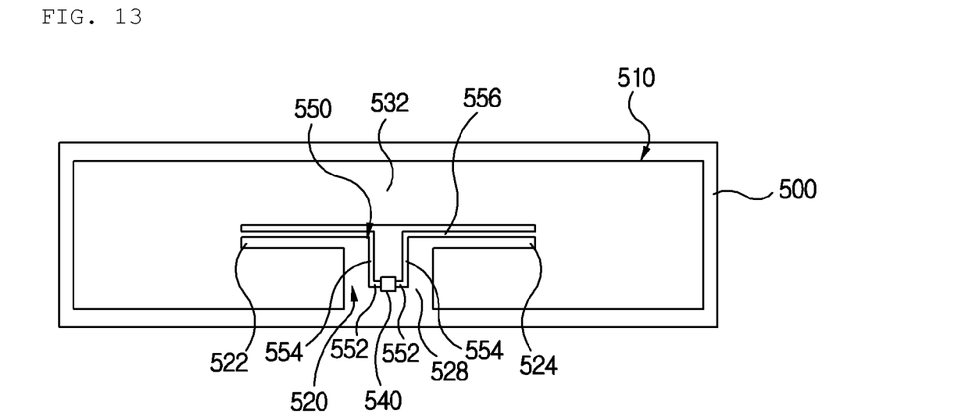
FIG. 13 is a planar view showing a construction of still another preferred embodiment of a tag of the present invention.

FIG. 13 is a diagram showing a construction of a preferred another embodiment of a tag of the present invention. A symbol 520 is a T type slot. The T type slot 520 is comprised of a lower part 528, a left-side 522, a right-side 524. Referring to FIG. 13, in constructing a tag of the present invention, it can be configured without forming both a plurality of first connection patterns and a plurality of second connection patterns.

While the present invention has been described in detail hereinabove through embodiments, it would be understood to those skilled in the art that various modifications can be made of the above-described embodiment without departing from the scope of the present invention.

Therefore, the scope of the present invention should not be restricted to the described embodiment, but should encompass the annexed claims and its equivalents.

What is claimed is:
1. An RFID tag, comprising:
a first dielectric substrate;
a radiation pattern printed on the first dielectric substrate, the radiation pattern including a first radiation pattern and a second radiation pattern;
a cross (+) type slot formed at a center of the first and the second radiation patterns;
a plurality of first connection patterns printed on an upper part of the cross (+) type slot and configured to directly connect the first and the second radiation patterns;
a tag chip in a lower part of the cross (+) type slot;

a feeding loop pattern configured to directly connect the tag chip and the radiation pattern; and a plurality of second connection patterns configured to connect the feeding loop pattern and the first and the second radiation patterns.

2. The RFID tag of claim 1, wherein gap materials are stacked at a lower part of the first dielectric substrate.

3. The RFID tag of claim 2, wherein the gap materials comprise:

a second dielectric substrate; and a first and a second parasitic metal layers on the second dielectric substrate, the first and the second parasitic metal layers formed in a predetermined interval.

4. The RFID tag of claim 1, wherein the feeding loop pattern includes:

first feeding loop patterns horizontally formed at left and right sides of the tag chip;

second feeding loop patterns upwardly curved at an each end of the first feeding loop patterns; and third feeding loop patterns horizontally curved at an each end of the second feeding loop patterns, and electrically connected to the first and the second radiation patterns by the plurality of the second connection patters.

5. An RFID tag, comprising:

a first dielectric substrate;

a radiation pattern printed on the first dielectric substrate, the radiation pattern including a first radiation pattern and a second radiation pattern;

a T type slot formed towards a center of the first and the second radiation patterns;

a tag chip settled in a lower part of the T type slot;

a plurality of first connection patterns printed on an upper part of the T type slot and configured to directly connect the first and the second radiation patterns;

a feeding loop pattern configured to directly connect the tag chip and the radiation pattern; and a plurality of second connection patterns configured to connect the feeding loop pattern and the radiation pattern at an end of the feeding loop pattern.

6. The RFID tag of claim 5, wherein gap materials are stacked at a lower part of the first dielectric substrate.

7. The RFID tag of claim 6, wherein the gap materials comprise:

a second dielectric substrate; and a first and a second parasitic metal layers on the second dielectric substrate, the first and the second parasitic metal layers formed in a predetermined interval.

8. The RFID tag of claim 5, wherein the feeding loop pattern (150) includes:

first feeding loop patterns horizontally formed at left and right sides of the tag chip;

second feeding loop patterns upwardly curved at an each end of the first feeding loop patterns; and third feeding loop patterns horizontally curved at an each end of the second feeding loop patterns, and electrically connected to the radiation pattern by the plurality of the second connection patterns.

* * * * *